(12) United States Patent
Rossi et al.

(10) Patent No.: US 7,936,094 B2
(45) Date of Patent: May 3, 2011

(54) DEVICE FOR PROTECTION FROM ACCIDENTS

(75) Inventors: Gian Andrea Rossi, Villa Guardia (IT); Paolo Cappellari, Cesano Brianza (IT); Cesare Svelto, Milan (IT); Michele Norgia, Prato Sesia (IT)

(73) Assignee: Redcap Technology S.R.L., Como (IT)

( * ) Notice: Subject to any disclaimer, the term of this patent is extended or adjusted under 35 U.S.C. 154(b) by 460 days.

(21) Appl. No.: 12/094,743

(22) PCT Filed: Nov. 25, 2005

(86) PCT No.: PCT/IT2005/000694
§ 371 (c)(1),
(2), (4) Date: May 22, 2008

(87) PCT Pub. No.: WO2007/060698
PCT Pub. Date: May 31, 2007

(65) Prior Publication Data
US 2008/0302626 A1    Dec. 11, 2008

(51) Int. Cl.
*H02H 11/00* (2006.01)

(52) U.S. Cl. ...................................................... 307/326
(58) Field of Classification Search ................... 307/326
See application file for complete search history.

(56) References Cited

U.S. PATENT DOCUMENTS

| | | | |
|---|---|---|---|
| 5,593,330 A * | 1/1997 | Kobayashi ...................... 440/84 |
| 5,942,975 A | 8/1999 | Sorensen | |
| 7,497,181 B2 * | 3/2009 | Viggiano et al. ........... 114/102.1 |
| 2005/0063133 A1 | 3/2005 | Mather et al. | |

FOREIGN PATENT DOCUMENTS

| | | |
|---|---|---|
| DE | 90 00 157 U1 | 9/1990 |
| DE | 296 22 144 U1 | 3/1997 |
| FR | 2 779 669 A1 | 12/1999 |
| FR | 2 831 476 A1 | 5/2003 |

* cited by examiner

*Primary Examiner* — Robert L. DeBeradinis
(74) *Attorney, Agent, or Firm* — Pearne & Gordon LLP (57) ABSTRACT

A device for protection from accidents comprises a protective support (2) to be interposed between an operator and a tool (3) to be used by said operator; the protection device further comprises cutoff/switching off means adapted to be active on the tool (3) at a minimum distance between the protective support (2) and the tool (3).

27 Claims, 5 Drawing Sheets

DEVICE FOR PROTECTION FROM ACCIDENTS

The present invention relates to a device for protection from accidents, adapted for use with operators working in contact with sharp tools such as chain saws, rotating blades and others.

It is known that in a great number of work environments sharp tools are used that are grasped and brought to working positions by different operators to carry out the desired operations; examples of these tools typically are chain saws used by woodsmen/gardeners or bone saws used by butchers.

Alternatively, work situations may occur in which there are dangerous tools operating in tight contact with the operators, such as in the case of circular saws in jointers' work shops and lathes.

Usually, an operator that is working with these tools or machinery wears protective garments having cut-preventing regions or padding at the points most exposed to the risks of traumas or injuries; in addition, where possible, the tools themselves are provided with protective shields to prevent the operator from coming accidentally into contact with the sharp cutting element (or in any case with the dangerous part of the tool itself).

Although the known art briefly described above offers a great number of solutions, it however has some limits.

In fact all protections on garments and/or tools operate in a completely passive manner, which means that their function is to avoid a possible contact between tool and operator causing physical damages to the operator, but clearly they are not able to offer an appropriate control on a situation of risk.

In other words, garments and protections on machinery are not able to invalidate the real source of risk of an accident or make it inoffensive (be it the blade of a chain saw or the jaw of a press), but their function is only to receive on themselves as much as possible, the damages resulting from a contact between the operator's body and said source of risk (which damages, in the absence of a protection, would be directly suffered by the operator).

Consequently, the passive protections of known type are not able to avert the risk of accidents in a definitive manner, since for example in case of situations of forced and extended contact between the operator and the source of risk, these passive protections can start to wear in an irreversible manner and therefore be quite devoid of their protective character, while the situation of risk is still going on in time.

In addition, in particularly dangerous cases (such as fast-running or very powerful rotating blades) possible interposition of the passive protections could generate damages to the operator just the same, because the operator, while being not submitted to the cutting or at all events dangerous action of the blade (or of any other part of the machinery) could get caught thereon, often due exactly to the protections he/she wears and consequently be tugged or pushed in an uncontrolled manner.

It is also to be pointed out that passive protections of known type are often local protections (gloves, shoulders, boots and others) and therefore are not able to prevent damages or traumas, should the dangerous machinery/tool be close to parts of the operator's body that are not protected by traditional devices.

Accordingly, the present invention mainly aims at conceiving a device for protection from accidents capable of solving the above mentioned drawbacks.

In particular, it is an aim of the present invention to conceive a protection device offering active safety to the operator or, in other words, the function of which is not restricted to a possibility of intervention between the operator's body and the potential source of risk so as to avoid injuries or traumatic events, but that is adapted to intervene on a mechanism capable of avoiding immediate damages while at the same time stopping protraction of the situation of risk.

In addition, the present invention aims at conceiving a protection device that can be operative in different work environments or in other words that can be interfaced with different types of potentially dangerous machinery and/or tools.

Another aim of the present invention is to make a protection device that can operate irrespective of the part of the operator's body that is close to a source of risk.

The foregoing and further aims are substantially achieved by a protection device in accordance with the features set out in the appended claims.

Further features and advantages will be more apparent from the description of an embodiment of a device for protection from accidents given by way of non-limiting example and illustrated in the accompanying drawings, in which.

The protection device in accordance with the present invention is generally identified by reference numeral 1 in the accompanying figures and it mainly comprises a protective support 2 to be put on by an operator and a tool 3 to be used by said operator.

At all events, in order to ensure maximum flexibility of use of the present invention, the protective support 2 can also take forms different from those of the traditional work garments, and generally can be suitable for being interposed between the tool 3 and the operator in such a manner as to offer a maximum safety degree.

For example, the protective support 2 may consist of a movable shielding or a protection in the form of a panel or a shell that can be positioned between one or more operators designed to work with a tool 3.

In other words, the present invention contemplates a wide variety of ways according to which the protective support 2 can be associated with at least one operator, obviously provided the protective support and the tool are operatively correlated with each other, as will be explained in more detail in the following.

At this point it is already possible to appreciate that the present invention represents an important structural and operative integration among the protections (which can be garments to be put on such as jackets, trousers, gloves or others) to be directly associated with the operator and among the equipment or machinery with which the operator has to work; in other words, in accordance with the present invention the protection device comprises some structural parts associable with the operator and other parts associable with the tool.

In fact, in accordance with the invention cutoff/switching off means is present which can be activated on the tool 3 at a minimum distance between the protective support 2 and the tool 3 itself.

This cutoff/switching off means to be described later on in one of the possible embodiments, can operate in a self-contained manner or can be interlocked with detecting means which in turn is adapted to signal reaching of the above mentioned minimum distance.

Within the scope of the present invention, the cutoff/switching off means is adapted to be set in a safety condition at which it inhibits operation of the tool 3 (following modalities to be clarified by way of example in the following) on signalling of a minimum distance by the detecting means; this "minimum distance" therefore can be selected arbitrarily depending on current requirements and for example can correspond either to a situation of contact between the tool 3 and the operator (in this case said distance can be defined as a null or zero distance) or to a situation of proximity (in which case the distance can be referred to as a non-zero distance of a predetermined value).

Generally, the detecting means comprises at least one active element 2a belonging to the support 2 and at least one user means 3a belonging to the tool 3; within the scope of the present invention, when these two parts are in a specific relative spatial configuration, reaching of the above mentioned minimum (zero or non-zero) distance can be defined and consequently intervention of the cutoff/switching off means can be operated.

In a possible embodiment of the present invention, the active element 2a and the user means 3a can be electrically connected in a closed electric circuit; in this case the minimum distance between the protective support 2 and the tool 3 will correspond to a contact condition between the active element 2a and the user means 3a and it can be easily signalled since in this closed electric circuit short-circuiting will occur.

With reference to the drawings, an embodiment of the closed electric circuit that can be created between the active element 2a and the user means 3a can be seen; the solid line "C" denotes an electric connection between one point of the tool 3 (herein a chain saw) electrically integral with the blade 3a and with the protective support 2 (herein a work jacket duly incorporating the active element 2a), whereas the chain line "T" between the chain saw blade and the jacket denotes the possibility that a contact may take place between these two objects. On occurrence of this contact which corresponds to setting up of a condition of high risk for the operator, the circuit between the active element 2a, that is conveniently disposed in the jacket 2, and the chain saw blade 3a closes; consequently, the so-called condition of "minimum distance" is automatically and immediately detected and therefore with the same suddenness and in an automatic manner as well, the cutoff/switching off means (embodied by the switch 3c in the figure) is operated, which means de-energises the motive apparatus for the blade 3a and stops it all of a sudden; in this manner the blade is prevented from exerting its cutting action on the jacket comprising the protective support 2 (even before exerting said action on the operator!).

Conveniently, in the embodiment described above the active element 2a can have any conformation provided it is adapted to conduct electric current; examples of this active element 2a will be shown in the following.

In an alternative embodiment of the present invention, the active element 2a is instead such structured that it can define a primary electromagnetic field having a predetermined spatial distribution; correspondingly, the user means 3a will be able to be electromagnetically activated in this primary electromagnetic field (also by a mere immersion/approaching to the space in which this primary field is generated) to induce an alteration and/or a secondary electromagnetic field therein, due to the well-known inductive phenomena.

In this case, the detecting means will comprise suitable measurement means of the alteration and/or the secondary magnetic field (that could be conveniently obtained using the presently available technologies) and as a result the minimum distance between the protective support 2 and the tool 3 will correspond to a predetermined measured value of said alteration and/or secondary magnetic field.

It will be recognised that in relation to the last mentioned embodiment the condition of "minimum distance" will be able to correspond to a contact between the user means 3a and the active element 2a, or will be able to correspond to a situation of proximity (and therefore to a minimum non-zero distance) between the user means and the active element; this results in a real intervention on the user means 3a before the latter can come into contact with the operator.

Conveniently, the tool 3 comprises a motor 3b interlocked with at least the cutoff/switching off means and/or the detecting means; the user means 3a is driven by the motor 3b and, as previously explained, on detection of the condition of "minimum distance" the cutoff/switching off means can be operated in such a manner as to turn the motor 3b off and therefore stop the user means 3a.

Should the motor 3b be of the electric type, the cutoff/switching off means and/or the detecting means could advantageously be directly active on the motor 3b itself, for example to break power supply thereto (which power supply may come from the mains or from suitable storage means 5).

If on the contrary the motor 3b is of the heat type (a traditional single-cylinder Otto engine for example, as currently used in lawn mowers or chain saws), the cutoff/switching off means and/or the detecting means would be indirectly active on the motor 3b itself; for example this means will be able to stop power supply to the ignition unit (or in other words to the spark plug or better to the ignition coil) of such a heat engine.

Conveniently, the present invention can contemplate other "indirect" intervention possibilities on the heat engine, such as cutting off of the fuel inflow or operation of a braking device.

From a structural point of view, the cutoff/switching off means may be made in a very simple manner; for example, in the accompanying figures said means comprises at least one first switch 3a interposed in a circuit between the motor 3b (and preferably a grounding point of the electric motor or a grounding point of the ignition unit of a heat engine) and the protective support 2 (preferably the active element 2a); this first switch 3c suitably piloted by the change of configuration of the above described detecting means, stops power supply at least at the minimum distance between the protective support 2 and the tool 3 by opening the respective supply circuit (of the motor if it is an electric motor and of the ignition unit of the engine 3b if it is a heat engine).

Alternatively, the first switch 3c can be an electronic circuit capable of calculating and/or measuring and/or comparing electromagnetic-field values to define the condition of minimum distance and stop power supply at least at the minimum distance between the protective support 2 and tool 3; in this case too, power supply to the motor 3b will be suitably stopped depending on the value of alteration or of the secondary electromagnetic field measured by the detecting means (this value will be suitably received and processed by the electronic circuit 3c, that will generate a corresponding control signal).

If the supply current/voltage (that is direct or indirect depending on the type of motor 3b used on tool 3) is particularly high, the presence of a second switch 3d in the cutoff/switching off means can be convenient, said second switch being interposed in a circuit between an electric motor 3b (or the ignition unit of a heat engine 3b) and the protective support 2 (preferably, the active element 2a disposed in this support 2).

This second switch 3d is operatively interlocked with the first switch 3c to stop power supply at least at the minimum distance between the protective support 2 and tool 3.

In the accompanying figures, it is possible to see a second switch 3*d* which is a force relays; this force relays is piloted by the static relays 3*c* (or also by said electronic circuit 3*c*, depending on current requirements) in a suitable manner based on the configuration of the detecting means.

In more detail, it is possible to see that during normal operation of tool 3 the force relays 3*d* is usually in a "closed" condition (therefore enabling operation of motor 3*b*), while on occurrence of the "minimum distance" condition closure of the static relays 3*c* (that till that moment was in an "open" condition) takes place, thereby causing opening of the force relays 3*d* that in turn breaks power supply to motor 3*b*.

In order to enable new switching on of the tool 3 (after the situation of risk has been eliminated), the present invention advantageously contemplates the presence of recocking means 4 associated in a circuit with the cutoff/switching off means and/or the detecting means; this recocking means can merely consist of a manual push-button that through suitable mechanical or electric transmissions acts on the switches 3*c* and/or 3*d* to bring them back to the above described conditions of "normal operation" or possibly to reset the electronic circuit 3*c* after the latter has detected a minimum distance and has sent the corresponding control signal.

Turning now to the protective support 2, it is possible to see that it can advantageously comprise a plurality of randomly-disposed electrically conductive particles and/or electrically conductive elements and/or portions of electrically conductive fabric and/or interlacing of a single electrically conductive filiform element. These electrically conductive bodies will more exactly constitute the active element 2*a* that in this way can be part of the detecting means (since it can be traveled over by electric current therefore giving rise to the above described short-circuiting, or can be traveled over by such a current as to generate the already described primary electromagnetic field).

Advantageously, the active element 2*a* will be able to have a high degree of structural integration with the protective support 2; more particularly, it is possible to see that the protective support 2 can comprise at least one additional substrate preferably made up of natural and/or artificial textile fibres, with which metal fibres can be interwoven.

Alternatively, the protective support 2 can consist of several fabric layers, some of which can be made up of metal wires, fibres or ribbons, while others can be formed of other materials (natural or synthetic textile fibres, aramidic fibres and so on).

Within the scope of the present invention, the active element 2*a* must have suitable electric-conductivity properties and/or be capable of generating a magnetic field; therefore, any material satisfying these requirements can be used for manufacturing said active element (metal materials, carbon/graphite fibres and so on).

Detection of the "minimum distance" condition through the detecting means can be obtained also in other ways relative to the already described ones; for example, the detecting means may comprise means for telemetric distance measurement (such as distance sensors of the types known with the abbreviations "MEMS", "MOTES", "RFID", "TINYOS" and "TINYDB") which is associable with the protective support 2 and/or the tool 3 and can conveniently detect the position of tool 3 or of the user means 3*a* relative to the active element 2*a* (or more generally relative to the protective support 2) and send a signal, in the form of electromagnetic waves for example, to be detected through the active element 2*a* (which in turn must behave like an antenna); on occurrence of a given type of signal, achievement of a "minimum safety distance" (denoted at "d" in figures) or of a contact can take place and therefore stopping of the user means 3*a* can be carried out.

According to a further embodiment of the present inventive idea, the device for protection from accidents can operate following the principle of a preventive stopping of operation of tool 3 not only on occurrence of a contact between the latter and the protective support 2, but also when said support is to a minimum distance; to this aim a construction architecture can be advantageously provided in which the detecting means comprises a unit for generating and/or transmitting an electromagnetic signal (which typically can be a radio signal to be advantageously emitted at least partly by the protective support 2 acting as an antenna) and a signal receiving unit for reception of the same electromagnetic signal (which receiving unit in turn will be associated with the tool 3).

Also present in this embodiment is a unit for measuring the power of the electromagnetic signal and also a feedback unit operatively associated with the power-measuring unit and adapted to stop operation of tool 3 depending on a given admissible maximum power value of the detected electromagnetic signal.

Based on the above principle, it will be utilised the fact that a given admissible maximum power value of the electromagnetic signal corresponds to a minimum safety distance "d" between an operator wearing the protective support 2 and the tool 3; practically, the generating and transmitting unit and the receiving unit can be considered as the mutually opposite faces of a capacitor so that, as known, the power of the electromagnetic signal is substantially proportional to the distance of the faces of this hypothetical capacitor.

In order to insulate operation of this structure from the great number of different external electromagnetic interferences as much as possible, a given waveform for the electromagnetic signal is to be suitably selected; for example said signal may comprise at least one high frequency sinusoid modulated with at least one square wave signal (in this case an on-off-keying radio signal is concerned).

In the example described just above, the width and/or frequency of the sinusoid and/or the square wave can be then suitably selected; for example, the sinusoid frequency can be equal to about 10 MHz and preferably the central band frequency can be equal to 12 MHz.

In more details in terms of structure, and with reference to the drawings, the generating and/or transmitting unit can comprise a timer (that will preferably be of the integrated type for reasons of compactness, reliability and low energy consumption and more preferably will have a current absorption lower than 300 microamps) and an oscillator operatively interlocked with said timer (typically, a Colpitts oscillator can be used).

Possibly, in order to avoid too heavy loads on the oscillator that would impair operation, the generating and/or transmitting unit can also include a voltage follower conveniently interposed between the timer and the oscillator.

In turn, the receiving unit essentially comprises: a power detector, a signal-conditioning block, a peak detector and a threshold comparator.

Conveniently, the power detector will be adapted to receive and process the signals emitted by the generating and/or transmitting unit; thus, should the electromagnetic signal be a radio signal, the power detector will preferably be of the radiofrequency type.

In addition, the power detector will be adapted to detect the signal received from an antenna and, to the aims of the present invention, this antenna will comprise the mentioned tool 3 at least partly; at the same time the power detector will be adapted to demodulate the received signal to reconstruct at least one square wave transmitted by the generating and/or transmitting unit.

The signal conditioning block is suitably connected to the power detector and is adapted to amplify and filter a signal from the power detector, while the peak detector is operatively connected, depending on current requirements, to the conditioning block and/or the power detector and is adapted to measure a peak value of a signal received from said block and detector.

Finally, the threshold comparator is operatively interlocked with the power detector and/or the peak detector and/or the conditioning block and is adapted to compare a measured power value with the maximum admissible value (that conveniently can be stored in an analogue or digital form based on presently known technologies).

Still for the purpose of optimising the receiving-unit performance and in particular of minimising the interference with possible electromagnetic alterations from the work environment, the receiving unit may further comprise a device of the PLL type that is suitable for phase and/or frequency synchronisation of the signal received from the receiving unit.

Conveniently, from an electronic point of view, the generating and/or transmitting unit (but also the receiving unit) can be also made using other electronic components presently available on the market (such as fully integrated circuits or others), provided they achieve the above described technical effect of "preventive measurement of the safety distance".

As pointed out, operation of the just described embodiment is based on the particular association between a maximum admissible power value and a minimum distance value, so that on rising above said maximum power value (which corresponds to going below the minimum distance value!) operation of tool 3 stops still before the latter can physically come into contact with the protective support 2.

In any case it will be recognised that, depending on current requirements, the just described architecture can be combined and/or integrated with one or more structural and/or operative features of the embodiments described in other parts of the present disclosure.

Still in connection with the last-mentioned embodiment, it will be appreciated that the electromagnetic technique used to detect proximity between the metal mesh of the active element and the dangerous tool consists in measuring the variation in the electric capacity between the tool and the mesh itself.

Figure 1A:
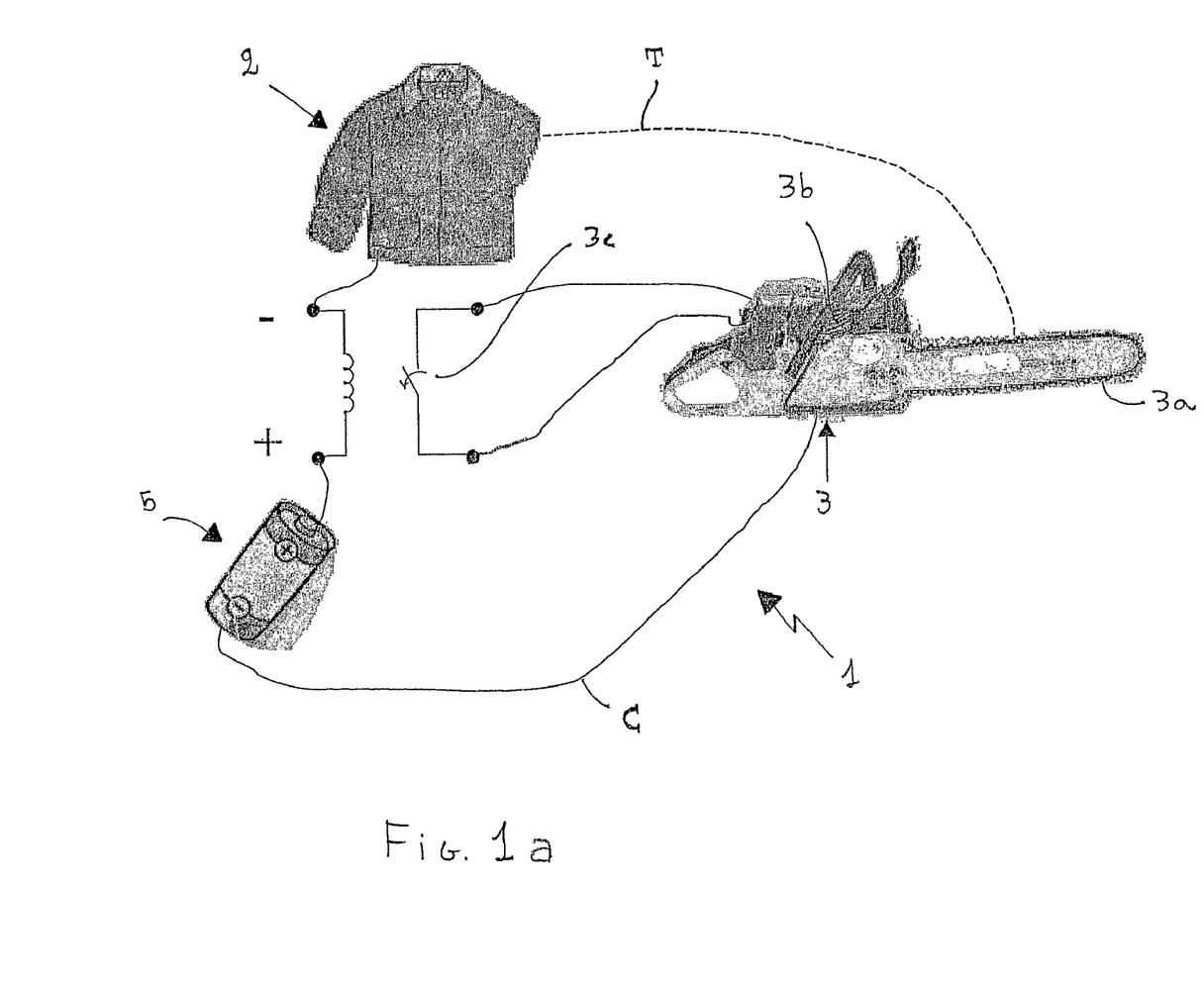
FIGS. 1a and 1b show general diagrams of a device in accordance with the present invention.
Figure 1B:
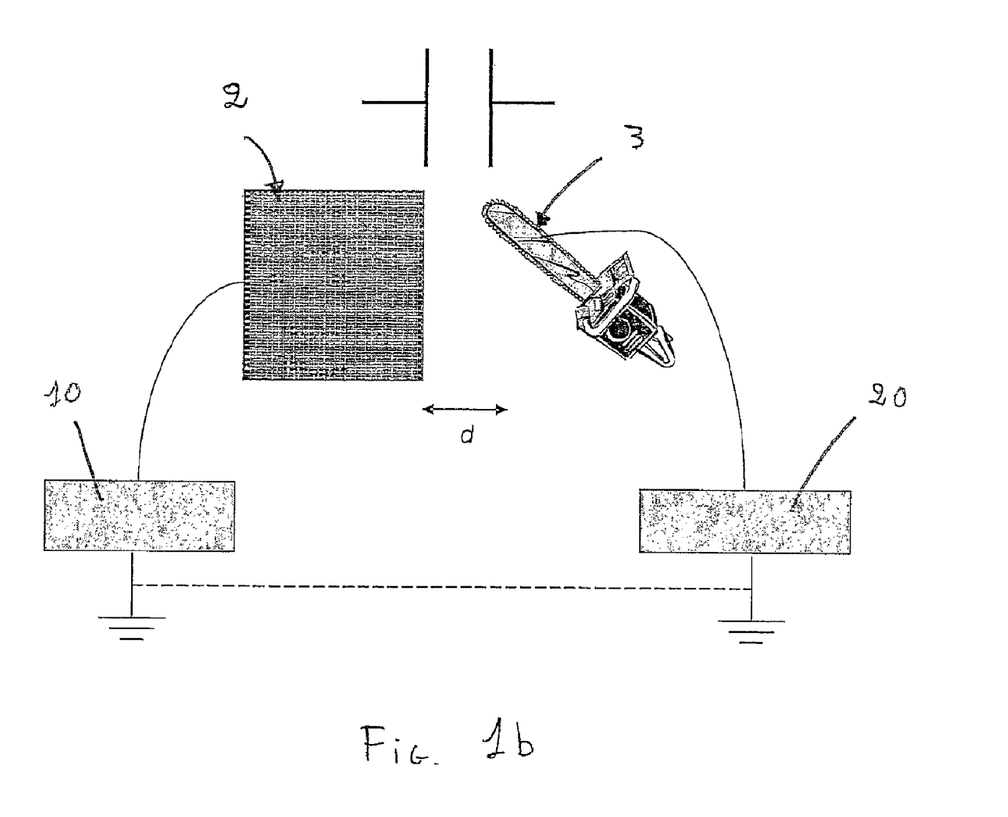
Figure 2:
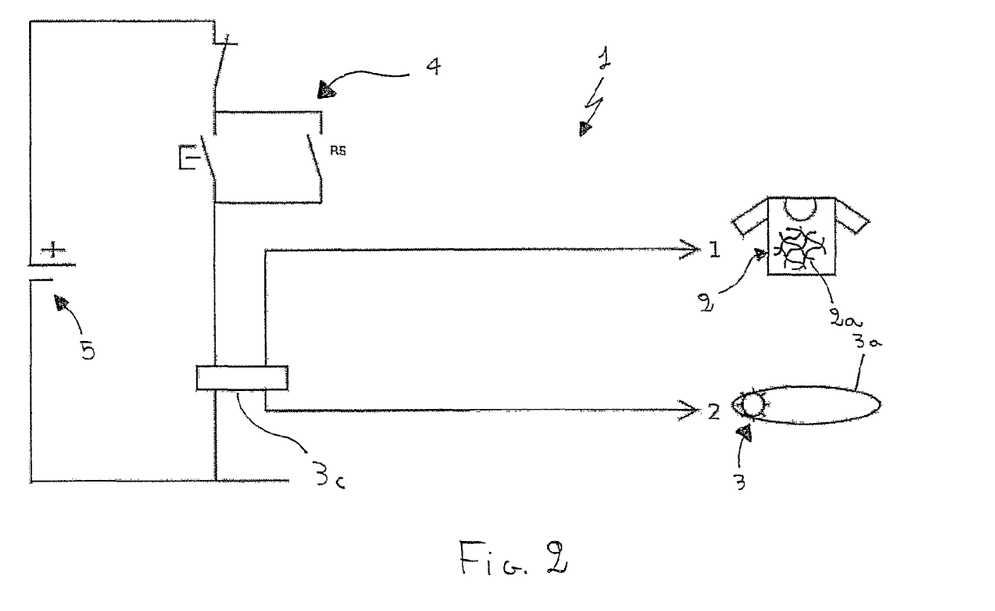
FIGS. 2, 3 and 4 show circuit diagrams of some alternative embodiments of the device seen in FIG. 1a and/or 1b.
Figure 3:
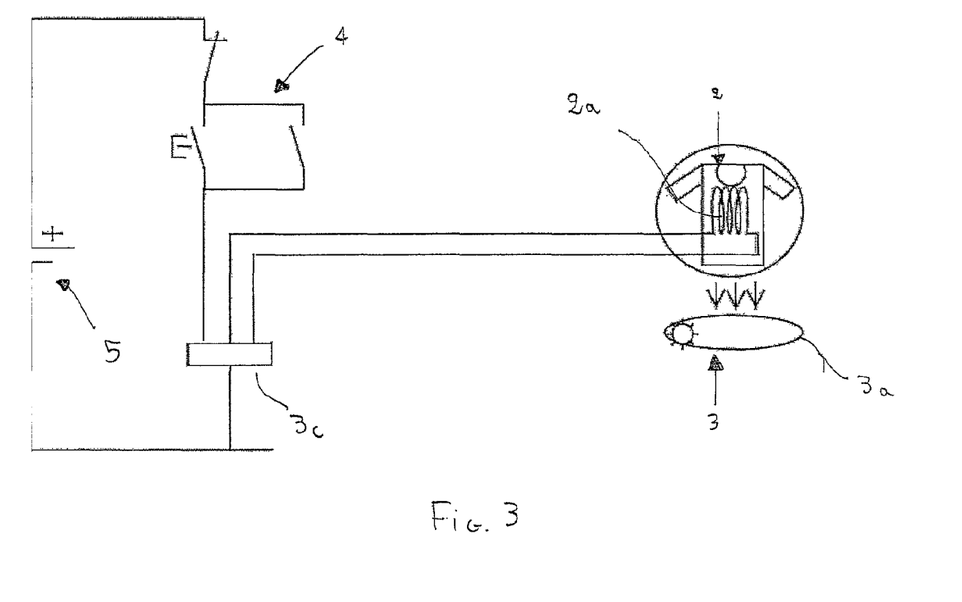
Figure 4:
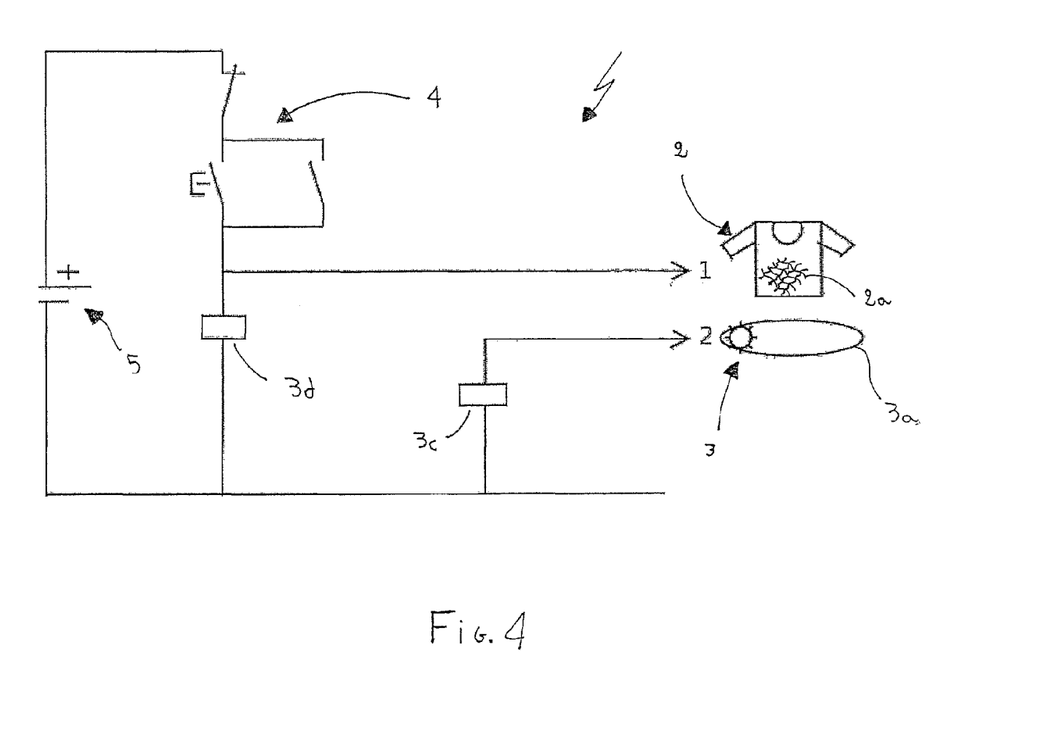

A radiofrequency circuit (as shown in FIG. 1*b*) is preferably used, wherein the radiofrequency signal generator is placed on the metal mesh (acting as the first plate of the capacitor) and the detector is connected to the tool (second plate of the capacitor); triggering of the alarm signal occurs when the signal detected by the receiving circuit overcomes a threshold level, which level is established depending on the particular application.

Typically, this "triggering level" is fixed to values corresponding to some centimetres of distance between the mesh and tool.

The transmitting circuit consists of a radiofrequency oscillator, possibly modulated to improve exemption from outer alterations and make the arrangement more reliable. The receiving circuit on the contrary must measure the level of the radiofrequency signal (directly depending on the minimum safety distance "d") and must also control the switching off and protection circuits when the level of the received signal exceeds a predetermined threshold.

The signal detection can directly be a width detection or, as previously detailed, a power detection, or it can be of a type synchronous with the transmitted (radiofrequency) signal, to decrease the possibility of false alarms.

Depending on current requirements, the architecture of the transmitter and receiver can also be reversed; in this case the metal mesh receives the signal produced by the tool and with a return transmitting route sends the switching-off message to the tool itself.

Depending on the specific application, the "RF signal" frequencies can vary from the range of some KHz to hundreds of MHz. This frequency range is restricted at the low frequencies by the receiver's sensitivity qualities and at the high frequencies by the fact that the whole metal mesh (which, as said, constitutes a fundamental part of the protective support 2) must have much smaller sizes than the wavelength of the electromagnetic field generated (to 100 MHz, a 3 m wavelength corresponds), not to have problems of adaptation that will lead to an unreliable system.

It is to be pointed out that the two objects (tool/implement and metal mesh/protective support) are to a much shorter distance than the wavelength of the transmitted signal, and therefore in a "reactive field" region. In this region no energy transmission occurs (the reactive fields close upon the source) and therefore there is no radiation. Due to the above, the measurement system is required to have a return connection to enable repetition of the detection and make it reliable, creating a closed circuit (see FIG. 1*b* again).

The return connection too, however, can be of the capacitive type, with the condition that the capacity of this connection must be greater than that determined between the metal mesh and the tool (or in other words, between the protective support 2 and the tool 3) to the distance to be measured.

For example as a return route it is possible to use the operator's hand holding the tool or, depending on the work conditions, closure of the circuit can take place through the operator's feet and the floor that is always someway connected to the machine tool; in this manner it is possible to get rid of a specific physical connection (through a conductor wire, for example) between the receiving unit and the generating/transmitting unit.

Calibration of the detecting system and consequent selection of the power corresponding to the minimum safety distance will be based on the specific application. Depending on the specific use of the contactless proximity detector, the operations to be carried out in case of detection of a danger will be identified.

At all events, power supply to the tool (of the motor in case of electric motors, of the ignition circuit in case of a combustion engine) is required to be stopped and possibly a braking/blocking system is to be activated to avoid the operator being injured, due to the direct contact between the moving parts of the machine tool.

Finally, it will be recognised that the levels of the transmitted radiofrequency power must be contained within the limits provided by law, to ensure a negligible exposure of the operator to the electromagnetic field; in this connection the safety parameters established by the International Commission for Non-Ionising Radiation Protection (ICNIRP, for example Guidelines for Limiting Exposure to Time-Varying Electric, Magnetic, and Electromagnetic Fields (up to 300 GHz), Health Physics Vol. 74, No. 4, pages 494-522, 1998).

The invention achieves important advantages.

First of all, it will be appreciated that the particular structural and operative combination of the elements of the device enables an efficient preventive action to be exerted on potential risk situations, inhibiting the dangerous parts of the tools/machinery from being still in operation on occurrence of a possible contact between said parts and the user's body.

At the same time, the present invention also offers a protection of the traditional type, due to the remarkable mechanical features of the protective support.

Furthermore, the present invention in its different embodiments is adapted to be used in many different work environments (with little or no modifications) where the most varied tools operate and where therefore very diversified risk situations can exist.

A further advantage of the present invention resides in the possibility of avoiding any type of damage to the operator, not only where there are risks of cuts or similar injures, but also where traumatic events of other nature (such as crushing or pulling actions, and so on) may arise.

Finally, due to the particular intervention modes of the present device, an extended protection concerning the operator's whole body is made possible, irrespective of the modalities according to which the operator approaches the dangerous tool.

The invention claimed is:

1. A device for protection from accidents, comprising:
   a protective support (2) associable with at least one operator; and
   a tool (3) to be used by said operator, said protective support (2) being adapted to be interposed between said at least one operator and said tool (3); and
   cutoff/switching off means to be activated on said tool (3) at a minimum distance between said protective support (2) and tool (3);
   wherein the protective support (2) comprises a plurality of randomly-disposed electrically conductive particles and/or electrically conductive elements and/or portions of an electrically conductive fabric and/or interlacing of a single thread-like electrically conductive element.

2. A device as claimed in claim 1, wherein it further comprises detecting means adapted to signal when said minimum distance is reached, said cutoff/switching off means being interlocked with said detecting means and being adapted to be set in a safety condition in which they prevent operation of the tool (3) when a minimum-distance signal is generated by the detecting means.

3. A device as claimed in claim 2, wherein the detecting means further comprises telemetric distance-measuring means associable with the protective support (2) and/or the tool (3).

4. A device as claimed in claim 1, wherein the detecting means comprises at least one active element (2a) belonging to the protective support (2) and at least one user means (3a) belonging to the tool.

5. A device as claimed in claim 4, wherein said active element (2a) and user means (3a) can be electrically connected in a closed circuit, the minimum distance between the protective support (2) and the tool (3) corresponding to a contact and/or short-circuiting condition between the active element (2a) and the user means (3a).

6. A device as claimed in claim 4, wherein said active element (2a) defines a primary electromagnetic field having a predetermined spatial distribution, said user means (3a) being adapted to be electromagnetically activated in said primary electromagnetic field to induce an alteration and/or a secondary electromagnetic field therein, the detecting means comprising means for measuring said alteration and/or secondary magnetic field, the minimum distance between the protective support (2) and the tool (3) corresponding to a predetermined measured value of said alteration and/or secondary magnetic field.

7. A device as claimed in claim 1, wherein the tool (3) comprises a motor (3b) at least interlocked with the cutoff/switching off means and/or the detecting means, the user means (3a) being operated by said motor (3b).

8. A device as claimed in claim 7, wherein the motor (3b) is of the electric type, the cutoff/switching off means and/or detecting means being directly active on the motor (3b) to stop power supply thereto.

9. A device as claimed in claim 7, wherein the motor (3b) is a heat engine, the cutoff/switching off means and/or detecting means being indirectly active on the engine (3b) as they break power supply to an ignition unit of said heat engine.

10. A device as claimed in claim 1, wherein the cutoff/switching off means comprises at least one first switch (3c) interposed in a circuit between the motor (3b) and the protective support (2), said first switch (3c) breaking said power supply at least at the minimum distance between the protective support (2) and the tool (3).

11. A device as claimed in claim 10, wherein said first switch (3c) is a static relay.

12. A device as claimed in claim 10, wherein said first switch (3c) is an electronic circuit capable of calculating and/or measuring and/or comparing electromagnetic-field values to define the minimum-distance condition and break power supply at least at the minimum distance between the protective support (2) and the tool (3) and/or the active element (2a) and the user means (3a).

13. A device as claimed in claim 1, wherein the cutoff/switching off means further comprises a second switch (3d) interposed in a circuit between a motor (3b) of the electric type or the ignition unit of a heat engine (3b), and the protective support (2), said second switch (3d) being operatively interlocked with said first switch (3c) to stop power supply at least at the minimum distance between the protective support (2) and the tool (3).

14. A device as claimed in claim 13, wherein said second switch (3d) is a force relay piloted by said static relay (3c) and/or said electronic circuit (3c).

15. A device as claimed in claim 1, wherein it comprises recocking means (4) associated in a circuit with the cutoff/switching off means and/or the detecting means.

16. A device as claimed in claim 1, wherein the protective support (2) further comprises at least one additional substrate.

17. A device as claimed in claim 1, wherein said detecting means comprises:
   a unit (10) for generating and/or transmitting an electromagnetic signal;
   a receiving unit (20) for said electromagnetic signal;
   a unit for measuring the power of said electromagnetic signal; and
   a feedback unit operatively associated with said power-measuring unit and adapted to stop operation of the tool (3) depending on a given maximum admissible power value of the electromagnetic signal.

18. A device as claimed in claim 17, wherein said maximum admissible power value of the electromagnetic signal corresponds to a minimum safety distance (d) between an operator wearing at least one protective support (2) and the tool (3).

19. A device as claimed in claim 17, wherein the generating and/or transmitting unit (10) and the receiving unit (20) can be equivalent to mutually opposite faces of a capacitor the power of the electromagnetic signal being substantially proportional to the distance of said faces of said capacitor.

20. A device as claimed in claim 17, wherein said electromagnetic signal comprises at least one high-frequency sinusoid modulated with at least one wave signal.

21. A device as claimed in claim 20, wherein the frequency of said sinusoid is about 10 MHz.

22. A device as claimed in claim 21, wherein the generating and/or transmitting unit (10) comprises:
- a timer; and
- an oscillator operatively interlocked with said timer.

23. A device as claimed in claim 22, wherein the generating and/or transmitting unit (10) further comprises a voltage follower interposed in a circuit between said timer and oscillator.

24. A device as claimed in claim 17, wherein said receiving unit (20) comprises:
- a power detector adapted to detect the signal received from an antenna, said antenna comprising said tool (3) at least partly, and to demodulate the received signal to reconstruct at least one square wave transmitted from the generating and/or transmitting unit;
- a signal conditioning block connected in a circuit to said power detector and adapted to amplify and filter a signal from the power detector;
- a peak detector operatively connected to said conditioning block and/or said power detector and adapted to measure a peak value of a signal received from said block and detector; and
- a threshold comparator operatively interlocked with the power detector and/or peak detector and/or conditioning block and adapted to compare a measured power value with said maximum admissible value.

25. A device as claimed in claim 24, wherein the receiving unit (20) further comprises a device of the PLL type adapted to carry out a phase and/or frequency synchronisation of the signal received by the receiving unit.

26. A device for protection from accidents, comprising:
- a protective support (2) to be worn by an operator and comprising an active element (2a) in turn comprising a plurality of randomly-disposed electrically conductive particles and/or electrically conductive thread-like elements and/or portions of an electrically conductive fabric and/or interlacing of a single thread-like electrically-conductive element;
- a tool (3) to be used by an operator, the tool (3) comprising a motor (3b) and at least one user means (3a) operatively interlocked with said motor (3b);
- detecting means to be connected with the protective support (2) and the user means (3a), said detecting means being adapted to signal reaching of a minimum distance between the protective support (2) and the user means (3a), the active element (2a) and the user means (3a) belonging to said detecting means and being adapted to be connected in a closed electric circuit, the minimum distance between the protective support (2) and the tool (3) corresponding to an electric-contact condition between the active element (2a) and the user means (3a); and
- cutoff/switching off means at least connected to the motor (3b) and adapted to be set in a safety condition in which they inhibit operation of the tool (3) when a minimum-distance signal is generated by the detecting means, said cutoff/switching off means in turn comprising:
  - a static relay (3c) interposed in a circuit between the grounding point of an electric motor (3b) or of the ignition unit of a heat motor (3b), and the active element (2a) of the protective support (2); and
  - a force relay (3d) interposed in a circuit between a power supply source and an electric motor (3b) or the ignition unit of a heat motor (3b), said force relay (3d) being operatively interlocked with said static relay (3c) to be piloted in a reversible manner to an open condition at least at the minimum distance between operator and tool (3).

27. A device for protection from accidents, comprising:
- a protective support (2) to be worn by an operator and defining a primary electromagnetic field having a predetermined spatial distribution, said protective support (2) comprising an electromagnetically active element (2a) comprising at least one interlacing of a single thread-like electrically-conductive element;
- a tool (3) to be used by an operator, the tool (3) comprising a motor (3b) and at least one user means (3a) operatively interlocked with said motor (3b), said user means (3a) being adapted to be activated electromagnetically in said primary electromagnetic field to induce an alteration and/or a secondary electromagnetic field therein;
- detecting means to be connected with the protective support (2) and the user means (3a), to measure said alteration and/or secondary magnetic field, the minimum distance between the active element (2a) and the user means (3a) corresponding to a predetermined measured value of said alteration and/or said magnetic field; and
- cutoff/switching off means at least connected to a motor (3b) of the electric type or to the ignition unit of a heat engine (3b) and to the detecting means, said cutoff/switching off means being adapted to be set in a safety condition in which they break power supply to said electric motor or to said ignition unit of a heat engine at a minimum-distance signal generated by the detecting means, said cutoff/switching off means comprising an electronic circuit capable of calculating and/or measuring and/or comparing the electromagnetic-field values to define the minimum-distance condition.

* * * * *